(12) United States Patent
Dykstra et al.

(10) Patent No.: US 6,450,430 B2
(45) Date of Patent: Sep. 17, 2002

(54) DRUM CHOPPER

(75) Inventors: Martin Dykstra, Jessen; Ludger Gausmann, Hagen, both of (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 7 days.

(21) Appl. No.: 09/725,790

(22) Filed: Nov. 29, 2000

(30) Foreign Application Priority Data

Dec. 3, 1999 (DE) .......................................... 199 58 455

(51) Int. Cl.$^7$ ............................................... B02C 18/18
(52) U.S. Cl. ........................ 241/294; 29/428; 241/242
(58) Field of Search ................................ 241/294, 242, 241/243; 29/428

(56) References Cited

U.S. PATENT DOCUMENTS

| | | | |
|---|---|---|---|
| 3,126,931 A | * 3/1964 | Blanshine et al. | 144/162.1 |
| 3,146,961 A | * 9/1964 | Putman | 241/191 |
| 4,454,995 A | * 6/1984 | Bloomquist | 144/174 |
| 4,969,605 A | * 11/1990 | Morin | 241/192 |

FOREIGN PATENT DOCUMENTS

| DE | 1 769 638 | 7/1958 |
|---|---|---|
| DE | 197 17 685 A1 | 11/1998 |

* cited by examiner

*Primary Examiner*—Mark Rosenbaum
(74) *Attorney, Agent, or Firm*—Husch & Eppenberger, LLC; Robert E. Muir; Richard J. Musgrave

(57) ABSTRACT

A drum chopper in which cutting blades are locked in a form-fitting relationship to blade receptacles includes a locking structure between the blades and receptacles and a clamping piece. In one embodiment, the locking structure is integrally formed in the bearing surfaces of the receptacle and the mating surfaces blade by a latch projection in the receptacle and a lug in the blade. In another embodiment, the locking structure is formed by matching grooves in the mating surfaces of the receptacle and blade and a key inserted into the matching grooves. The clamping piece is inserted between the blade and a stop in the receptacle to secure the arrangement.

24 Claims, 2 Drawing Sheets

DRUM CHOPPER

FIELD OF THE INVENTION

The present invention relates generally to agricultural machinery and, more particularly, to a drum chopper with an improved cutting blade mounting arrangement.

BACKGROUND OF THE INVENTION

In some agricultural machines, crop material is fed into a drum chopper where a cutter chops the material and then discharges it. The drum chopper includes a housing and a fixed horizontal axis. A cutter mechanism rotates about the horizontal axis and within the housing and includes several receptacles, which are arranged in groups of at least two and equidistant from one another around the outer circumference of the cutter mechanism. A blade, which has a shape similar to the cross-section of a bowl, is attached to each group of receptacles.

A system for mounting the blades to the receptacles is known from U.S. Pat. No. 3,126,931. In the described system, the receptacles have mounting surfaces intended to accept the curved back surfaces of the blades. The individual blades are provided with mounting holes passing entirely through the blades to allow the blades to be secured to the receptacles by bolts. This design contains multiple drawbacks. First, the mounting holes weaken the blades. Also, bolting the blades into a form-locking relationship with the receptacles introduces undefined stresses arise in the blades. Another disadvantage arises due to the adverse affect on the flow of chopped crop material by the bolt heads extending into the bowl of the blades. Furthermore, because the bolt heads are located near the cutting edges of the blades, they are subjected to increased wear by the stream of chopped crop material.

The present invention is directed to overcoming one or more of the problems set forth above.

SUMMARY OF THE INVENTION

An aspect of the invention is to provide an arrangement for mounting the blades to the receptacles such that the structural integrity of the blades is maintained and that additional stresses on the blades are minimized.

In accordance with another aspect of the invention, there is provided a drum chopper in which cutting blades are locked in a form-fitting relationship to blade receptacles. The form-fitting relationship between the receptacles and blades is secured by a locking structure between the mating surfaces of each receptacle and blade and a clamping piece. In one embodiment, the locking structure is integrally formed in the mating surfaces of the receptacle and blade by a latch projection in the receptacle and a lug in the blade. In another embodiment, the locking structure is formed by matching grooves in the mating surfaces of the receptacle and blade and a key inserted into the matching grooves. The clamping piece is inserted between the blade and a stop in the receptacle to secure the arrangement.

Other objects, aspects, features and advantages of the present invention will become apparent from the following detailed description when taken in conjunction with the accompanying drawings. These aspects are merely illustrative and nonlimiting examples with the possibility of numerous other aspects being present with this invention.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
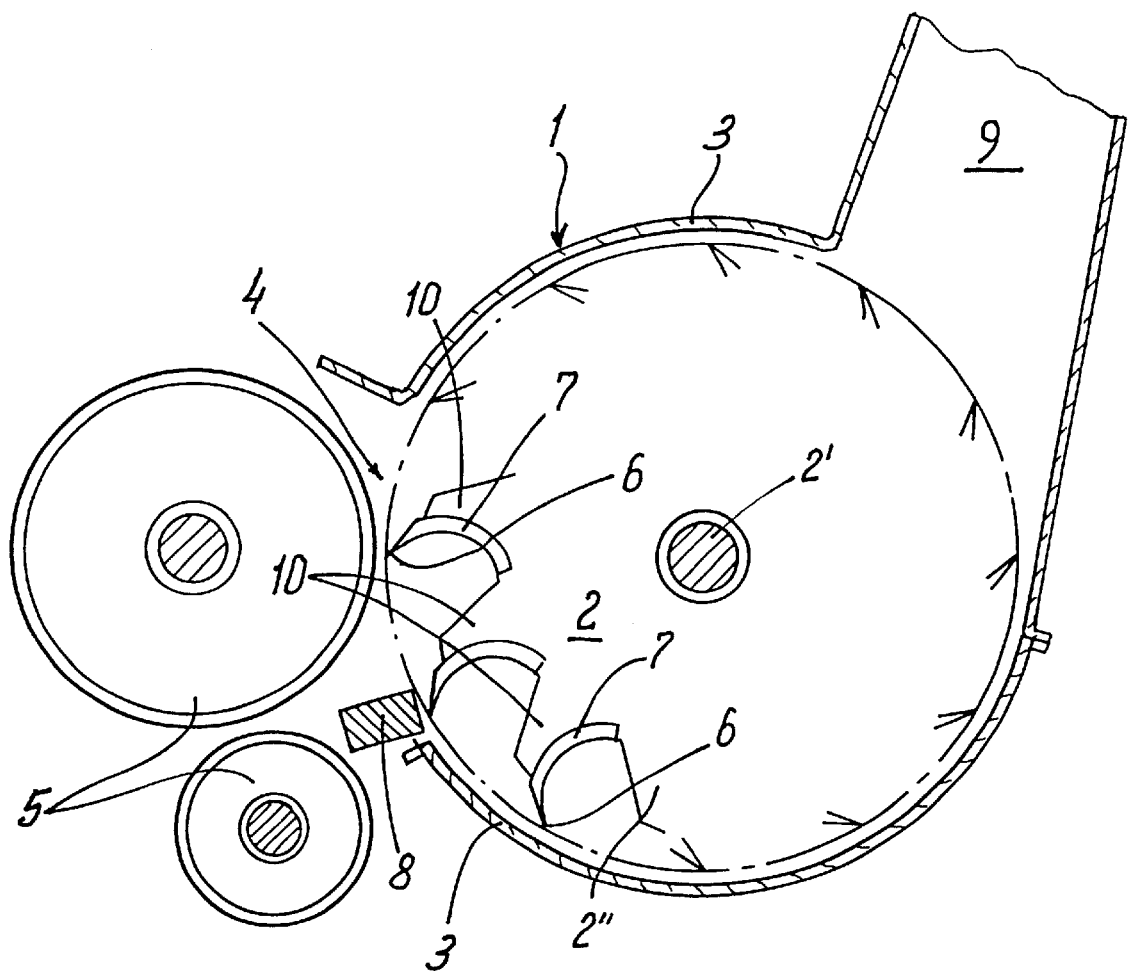
FIG. 1 is a partial side view of a drum chopper.

A drum chopper 1 is shown in FIG. 1. The drum chopper 1 includes a cutting mechanism 2 and a housing 3 with a housing entrance 4 to allow crop material to enter the drum chopper 1. In front of the housing entrance 4 are mounted rollers 5 which deliver the crop material. The action of cutting edges 6 of blades 7 in cooperation with a cutterbar 8 chops the crop material. The cutterbar 8 is displaceably mounted on the housing 3. The crop material is ejected through a discharge shaft 9 after it has been chopped.

Figure 2:
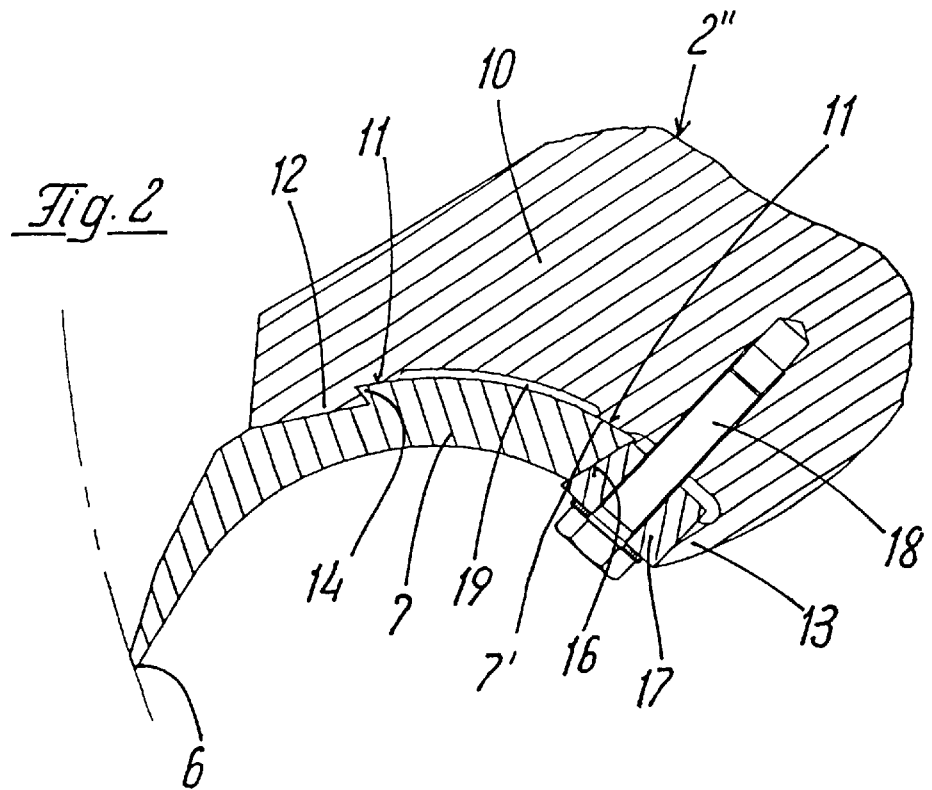
FIG. 2 is an enlarged view of the interface between a receptacle and a blade in the drum chopper of FIG. 1 incorporating an embodiment of the present invention.
Figure 3:
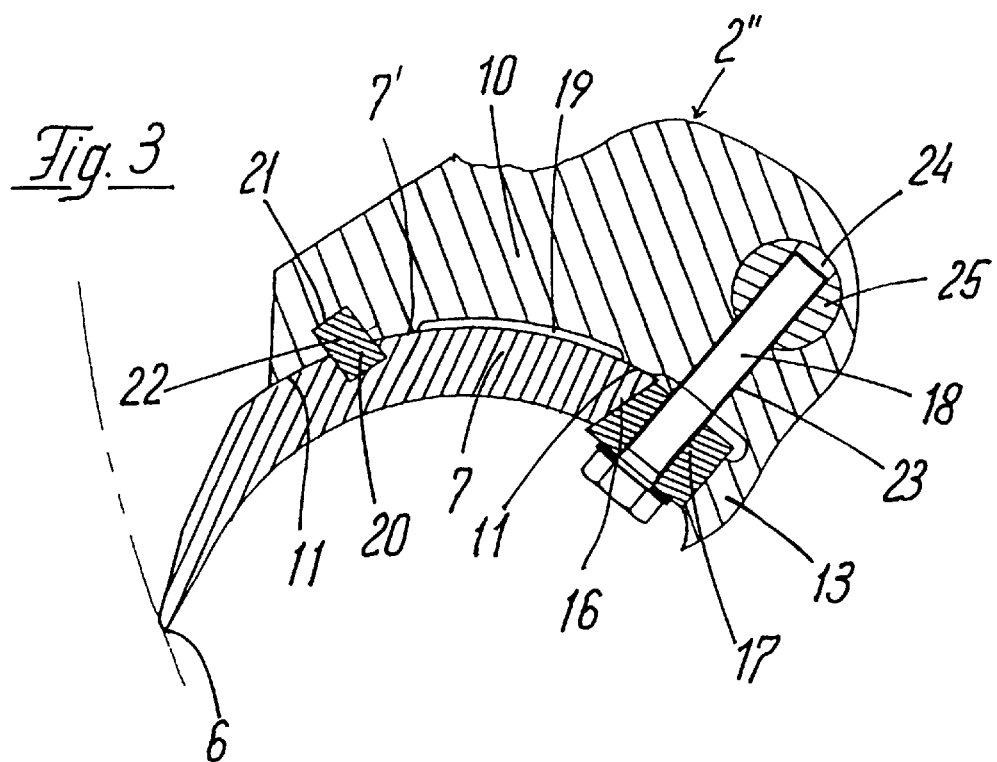
FIG. 3 is an enlarged view of the interface between a receptacle and a blade in the drum chopper of FIG. 1 incorporating another embodiment of the present invention.

The cutting mechanism 2 includes a plurality of drum discs 2" which are mounted on a fixed horizontal shaft 2'. Receptacles 10 to support the blades 7 are located at the outer circumference of the drum discs 2". As shown in FIGS. 2 and 3, the receptacles 10 include bearing surfaces 11 that are shaped to accommodate the mating surfaces 7' of the blades 7.

As shown in FIGS. 2 and 3, a locking structure is formed between the bearing surfaces 11 of the receptacles 10 and the mating surfaces 7' of the blades 7 to secure the blades 7 to the receptacles 10. In the embodiment illustrated in FIG. 2, the bearing surface 11 of each receptacle 10 includes a latch projection 12 and a stop 13. The mating surface 7' of each blade 7 is provided with a lug 14. When the blades 7 are mated with the receptacles 10, each lug 14 engages behind one of the latch projections 12. A clamping piece 17 is inserted between the back 16 of each blade 7 and each stop 13. The clamping piece 17 is secured to the receptacle 10 by a bolt 18. The back 16 of each blade and the region of the clamping piece 17 matching the back 16 of each blade 7 have inclined surfaces. As the clamping piece 17 is bolted into place, the inclined surfaces of the clamping piece 17 and the back 16 of the blade cooperate to wedge the lug 14 against the latch projection 12. This secures the connection between each blade 7 and each receptacle 10.

FIG. 3 illustrates an alternate embodiment. Both the blade 7 and the receptacle 10 are provided with matching grooves 20, 21. These grooves 20, 21 are placed on the bearing surface 11 and the mating surface 7' so that both grooves are aligned with one another when the blade 7 and receptacle are assembled. A flat key 22 is inserted into the matching grooves 20, 21. As in the previous embodiment, this arrangement is tightened by a clamping piece 17, which is inserted between the back 16 of the blade 7 and a stop 13 on the receptacle 10. However, the clamping piece 17 is not bolted directly to the receptacle 10 in this embodiment. Instead, the bolt 18 first passes through a hole 23 in the receptacle 10 and is screwed into a round bar 25 which is rotatably mounted in a transverse hole 24 in the receptacle 10. As the bolt 18 is tightened, the clamping piece 17 locks the arrangement by forcing the matching grooves 20, 21 into an offset position, thereby wedging the key 22 between the matching grooves 20, 21.

Each receptacle 10 is also provided with a recessed free space 19 in the bearing surface 11 of the receptacle. These recessed free spaces 19 assist in equalizing the stresses imposed on the blades 7.

While preferred embodiments of the present invention have been illustrated and described, this has been by way of illustration and the invention should not be limited except as required by scope of the appended claims.

We claim:

1. A drum chopper, having a horizontal axis, comprising:
   a plurality of drum discs, each having an outer circumference, rotatable about said horizontal axis of said drum chopper;
   a plurality of receptacles, each having a bearing surface, connected to said outer circumference of each said drum disc;
   a plurality of blades, each having a mating surface, connected to said bearing surface of each said receptacle;
   a locking structure formed between a latch projection of said bearing surface of each said receptacle and a lug on a mating surface of each said blade; and
   a clamping mechanism located between each said blade and each said receptacle, wherein said clamping mechanism wedges the lug against the latch projection, thereby securing each said blade to each said receptacle.

2. A drum chopper as set forth in claim 1, wherein each said blade has a back surface and each said receptacle has a stop and wherein each said clamping mechanism includes a clamping piece inserted between said stop and said back surface.

3. A drum chopper as set forth in claim 2, wherein each said clamping piece and said back surface of each said blade are provided with cooperating inclined surfaces.

4. A drum chopper as set forth in claim 2, wherein each said clamping piece is held in connection with each said receptacle by a bolt.

5. A drum chopper as set forth in claim 1, wherein each said bearing surface of each said receptacle is provided with recessed areas.

6. A drum chopper, having a horizontal axis, comprising:
   a plurality of drum discs, each having an outer circumference, rotatable about said horizontal axis of said drum chopper;
   a plurality of receptacles, each having a bearing surface, connected to said outer circumference of each said drum disc;
   a plurality of blades, each having a mating surface, connected to said bearing surface of each said receptacle;
   a locking structure formed between said bearing surface of each said receptacle and a mating surface of each said blade, and wherein said locking structure includes matching grooves in said bearing surface of each said receptacle and in a mating surface of each said blade and a key that is inserted into said matching grooves; and
   a clamping mechanism located between each said blade and each said receptacle, wherein said clamping mechanism forces the matching grooves into an offset position wedging the key between the matching grooves, thereby securing each said blade to each said receptacle.

7. A drum chopper as set forth in claim 6, wherein each said blade has a back surface and each said receptacle has a stop and wherein each said clamping mechanism includes a clamping piece inserted between said stop and said back surface.

8. A drum chopper as set forth in claim 7, wherein each said clamping piece and said back surface of each said blade are provided with cooperating inclined surfaces.

9. A drum chopper as set forth in claim 7, wherein each said clamping piece is held in connection with each said receptacle by a bolt.

10. A drum chopper as set forth in claim 6, wherein each said bearing surface of each said receptacle is provided with recessed areas.

11. In a drum chopper, having a horizontal axis, comprising:
    a plurality of drum discs rotatable about said horizontal axis and each said drum disc having an outer circumference;
    a plurality of receptacles connected with said outer circumference of each of said drum discs, each said receptacle having a bearing surface, and a plurality of blades that are connected with each said bearing surface of each said receptacle with each blade having a mating surface;
    a mounting arrangement between each said blade and each said receptacle;
    a locking structure formed between a latch projection of said bearing surface of each said receptacle and a lug on each said mating surface of each said blade; and
    a clamping mechanism between each said blade and each said receptacle, wherein said clamping mechanism wedges the lug against the latch projections, thereby securing each said blade to each said receptacle.

12. A drum chopper as set forth in claim 11, wherein each said blade has a back surface and each said receptacle has a stop and wherein each said clamping mechanism includes a clamping piece inserted between said stop and said back surface.

13. A drum chopper as set forth in claim 12, wherein each said clamping piece and said back surface of each said blade are provided with cooperating inclined surfaces.

14. A drum chopper as set forth in claim 12, wherein each said clamping piece is held in connection with each said receptacle by a bolt.

15. A drum chopper as set forth in claim 11, wherein each said bearing surface of each said receptacle is provided with recessed areas.

16. In a drum chopper, having a horizontal axis, comprising:
    a plurality of drum discs rotatable about said horizontal axis and each said drum disc having an outer circumference;
    a plurality of receptacles connected with said outer circumference of each of said drum discs, each said receptacle having a bearing surface, and a plurality of blades that are connected with each said bearing surface of each said receptacle with each blade having a mating surface;
    a mounting arrangement between each said blade and each said receptacle;
    a locking structure formed between said bearing surface of each said receptacle and each said mating surface of each said blade, wherein each said locking structure includes matching grooves in said bearing surface of each said receptacle and in a mating surface of each said blade and a key that is inserted into said matching grooves; and
    a clamping mechanism between each said blade and each said receptacle.

17. A drum chopper as set forth in claim 16, wherein each said blade has a back surface and each said receptacle has a stop and wherein each said clamping mechanism includes a clamping piece inserted between said stop and said back surface.

18. A drum chopper as set forth in claim 17, wherein each said clamping piece and said back surface of each said blade are provided with cooperating inclined surfaces.

19. A drum chopper as set forth in claim 17, wherein each said clamping piece is held in connection with each said receptacle by a bolt.

20. A drum chopper as set forth in claim 16, wherein each said bearing surface of each said receptacle is provided with recessed areas.

21. A method for assembling a drum chopper, having a horizontal axis, comprising:

utilizing a plurality of drum discs, each having an outer circumference, rotatable about said horizontal axis of said drum chopper;

connecting a plurality of receptacles, each having a bearing surface, to said outer circumference of each said drum disc;

connecting a plurality of blades, each having a mating surface, to said bearing surface of each said receptacle;

forming a locking structure by a latch projection in said bearing surface of each said receptacle and a lug in said mating surface of each said blade;

engaging said lug and said latch projection; and locating a clamping mechanism between each said blade and each said receptacle.

22. The method for assembling a drum chopper as set forth in claim 21, further including the step of:

inserting a clamping piece of said clamping mechanism between a stop of each said receptacle and a back surface of each said blade.

23. A method for assembling a drum chopper, having a horizontal axis, comprising:

utilizing a plurality of drum discs, each having an outer circumference, rotatable about said horizontal axis of said drum chopper;

connecting a plurality of receptacles, each having a bearing surface, to said outer circumference of each said drum disc;

connecting a plurality of blades, each having a mating surface, to said bearing surface of each said receptacle;

forming a locking structure by matching grooves in said bearing surface of each said receptacle and said mating surface of each said blade;

offsetting the matching grooves, having a key contained therein;

securing said mating surface of each said blade to said bearing surface of each said receptacle; and locating a clamping mechanism between each said blade and each said receptacle.

24. The method for assembling a drum chopper as set forth in claim 23, further including the step of:

inserting a clamping piece of said clamping mechanism between a stop of each said receptacle and a back surface of each said blade.

\* \* \* \* \*